US010469668B1

(12) United States Patent
Oroskar et al.

(10) Patent No.: US 10,469,668 B1
(45) Date of Patent: Nov. 5, 2019

(54) DETERMINING ACCESS PARAMETERS BASED ON LIKELIHOOD OF HD VOICE SERVICE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/691,538

(22) Filed: Aug. 30, 2017

(51) Int. Cl.
| | |
|---|---|
| *H04W 28/18* | (2009.01) |
| *H04W 68/02* | (2009.01) |
| *H04M 7/00* | (2006.01) |
| *H04W 88/06* | (2009.01) |
| *H04W 88/08* | (2009.01) |
| *H04W 28/26* | (2009.01) |

(52) U.S. Cl.
CPC ........... *H04M 7/006* (2013.01); *H04W 68/02* (2013.01); *H04W 28/18* (2013.01); *H04W 28/26* (2013.01); *H04W 88/06* (2013.01); *H04W 88/08* (2013.01)

(58) Field of Classification Search
CPC ..... H04W 28/18; H04W 28/26; H04W 80/10; H04W 88/182; H04W 36/0022; H04W 4/16; H04W 60/00; H04W 76/15; H04M 7/006
See application file for complete search history.

(56) References Cited

U.S. PATENT DOCUMENTS

| | | | | |
|---|---|---|---|---|
| 2003/0035401 | A1* | 2/2003 | Shaheen | H04L 29/06 370/341 |
| 2005/0201336 | A1* | 9/2005 | Lee | H04L 12/66 370/335 |
| 2005/0221826 | A1* | 10/2005 | Lee | H04L 29/06027 455/436 |
| 2013/0230057 | A1* | 9/2013 | Hori | H04W 76/10 370/466 |
| 2017/0006078 | A1* | 1/2017 | Leung | H04L 65/1069 |
| 2017/0054784 | A1* | 2/2017 | Panattu | H04L 65/80 |

* cited by examiner

*Primary Examiner* — Jean A Gelin (57) ABSTRACT

An exemplary method involves a user equipment (UE) receiving a communication-origination request to initiate a communication with a given counterpart. In response, the UE: (a) uses historical communication data for one or more previous communications as a basis for evaluating whether the UE is likely to be assigned a particular codec, from a plurality of possible codecs, for communication with the given counterpart; (b) based on results of the evaluation, determines a respective setting for each of one or more access parameters affecting a likelihood of successfully establishing the communication with the given counterpart; and (c) performs the communication-origination process according to the determined settings for the one or more access parameters, to initiate the requested communication with the given counterpart.

20 Claims, 4 Drawing Sheets

DETERMINING ACCESS PARAMETERS BASED ON LIKELIHOOD OF HD VOICE SERVICE

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

In order to utilize legacy cellular networks, a service provider may implement a hybrid wireless communication system that includes multiple separate but interconnected RANs. For example, a service provider may implement a first RAN that provides high speed data communications, and a second RAN that provides traditional telephony service, with each RAN providing air interface coverage according to a different air interface protocol. In such an arrangement, a UE may acquire connectivity with and be served by the first RAN and may at some point transition to instead connect with and be served by the second RAN. For instance, some existing hybrid systems include an LTE RAN (e.g., the LTE RAN discussed above) for data communications and a circuit-switched RAN, such as a CDMA RAN (or GSM RAN or the like), for legacy telephone service.

A UE that operates in a hybrid system may be configured as a single radio device, which utilizes the same radio system for communications on both networks in the hybrid system. In the context of a hybrid system utilizing LTE for data communications, a UE with the capability of using one radio system for both LTE communication and communication under at least one other protocol (e.g., CDMA) may be referred to as a single-radio LTE (SRLTE) device or an SRLTE UE. Similarly, when using a single radio system to engage in communication under LTE and at least one other protocol may be referred to as operating in an SRLTE mode.

When operating in a hybrid system, an SRLTE UE can register with both the LTE network and the CDMA network. However, when LTE service is available, an SRLTE UE will remain connected to the LTE network, except for cases when communication via the CDMA network is needed, such as tuning away to listen for pages or initiate a voice call via the CDMA network. As such, an SRLTE UE periodically disconnects from the LTE network and tunes to the CDMA network (e.g., at scheduled paging occasions) to check for any page messages directed to the UE from the CDMA network. If the SRLTE UE does not receive a page from the CDMA network, then UE, it will re-connect to the LTE network.

By way of example, in an LTE RAN, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network.

A CDMA RAN may include one or more base transceiver stations (BTSs) (e.g., macro network cell towers and/or femtocells), each of which may radiate to define a cell and cell sectors in which UEs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other UE that is positioned within coverage of the RAN can then communicate with a BTS and in turn, via the BTS, with other served devices or with other entities on the transport network.

According to illustrative CDMA protocols, the forward link may define (i) a pilot channel on which the RAN may broadcast a pilot signal to allow UEs to detect wireless coverage, (ii) system parameter channels (e.g., a sync channel) on which the RAN may broadcast system operational parameters for reference by UEs so that the UEs can then seek network access, (iii) paging channels on which the RAN may broadcast page messages to alert UEs of incoming communications, and (iv) traffic channels on which the RAN may transmit bearer traffic (e.g., application data) for receipt by UEs. And the reverse link, for example, may define (i) access channels on which UEs may transmit "access probes" such as registration messages and call origination requests, and (ii) traffic channels on which UEs may transmit bearer traffic for receipt by the RAN.

When a UE seeks to initiate a voice call via a CDMA network, the UE may request that network resources be allocated for the voice call. As part of this process, the RAN determines the transmit power to use for forward-link traffic. To do so, the RAN may first transmit at an initial transmit power, which is typically a constant power level that is preset at the RAN. The UE then evaluates the forward-link signal quality, such as by determining the frame error rate (FER), and reports back to the RAN. Then, depending on the signal quality, the RAN may increase or decrease the transmit power by a predetermined increment. The RAN and UE may then repeat this process until a satisfactory signal quality is achieved.

Further, for certain types of communication, such as voice calls, video calls, and/or other types of calls, a UE may be able to use two or more different types of codecs when engaging in such communication. Each codec may have different characteristics that impact the extent of resources used when the UEs are communicating.

Overview

Exemplary methods and systems may be implemented by a user equipment (UE) in an effort to increase or decrease the likelihood that a connection to a radio access network (RAN) is successfully established for a voice communication, when it is determined that the communication is likely to be assigned a high-quality codec, such as a codec for HD Voice communication.

In an exemplary embodiment, a UE may support various types of codecs for voice calls using a code division multiple access (CDMA) protocol. These codecs may define how media content (e.g., voice, music, still images, and/or video) are encoded and decoded. Different codecs may have different features. For instance, a voice codec used by a UE might encode and decode digital voice at a rate of 1 to 15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec, which typically improves as more bandwidth is utilized.

There may be various scenarios where a radio access network (RAN) assigns a codec to a given UE, such as during call setup and/or when paging a UE. For example, when a UE seeks to originate a voice call, the RAN may assign a codec for the call by selecting from two or more different codecs that are supported by the originating UE and/or the terminating UE for the call. Other factors may also be considered when assigning a codec for a voice call.

In cellular communication networks, one of the highest-quality (if not the highest quality) codecs that can be assigned for a voice call is the codec for "HD Voice." Note that herein, a characterization of the quality provided by a codec should be understood to indicate the quality of the media produced by that codec. For instance, a "high-quality codec" should be understood as being a codec that generally produces media of a higher quality (as compared to some other codec that generally produces media of a lower quality).

In a further aspect, in order to conduct an HD Voice call (e.g., utilizing COP 0), it may be necessary for all participants in the call to be capable of HD Voice. In other words, in a two-way call, the originating UE and the terminating UE would both need have the hardware, software, and/or firmware necessary to engage in an HD Voice call, and network conditions for both UEs must be sufficient to support HD Voice communications. Thus, even if a given UE could utilize COP 0 for a given call, it might not be able to do so if the counterpart in the call is not capable of HD Voice.

Further, since it may be desirable for a wireless carrier to promote HD Voice calls due to the higher-quality user experience they provide, a wireless carrier may allow and/or cause a UE to implement an exemplary method to increase the probability of successfully establishing a voice call that is likely to utilize HD Voice. Configured as such, the UE can evaluate its call history with the particular contact to whom a call is being placed, and determine whether it is likely the call will be conducted using HD Voice, before a codec is assigned for the call. In particular, the UE may review data for one or more previous calls with the particular contact, and determine whether the previous call or calls were HD Voice calls. The UE can then determine whether or not the call that is being initiated is likely to be an HD Voice call, based on whether or not the previous calls to the same contact were HD Voice calls. And, in the case where the UE determines that an HD Voice call is likely, the UE can adjust one or more access parameters in an effort to increase the probability that the current call is successfully established.

Since such an adjustment to a UE's access parameter(s) can result in the UE increasing its transmission power when initiating the call, this call-origination process may utilize more network resources than it otherwise would. However, by first evaluating whether past calls with a particular counterpart indicate that an HD Voice call is likely (or perhaps just possible), a UE may avoid increasing its transmission power and utilizing unnecessary network resources when it believes that the particular counterpart to a call is incapable of or unlikely to be able to engage in an HD Voice call. Thus, exemplary methods can help to balance the desire to promote HD Voice calls by increasing the percentage of HD Voice calls that are successfully established, with the desire to utilize network resources as efficiently as possible.

More generally, in one aspect, an exemplary method involves a UE receiving a communication-origination request to initiate a communication with a given counterpart. In response to the communication-origination request, the UE: (a) uses historical communication data for one or more previous communications as a basis for evaluating whether the UE is likely to be assigned a particular codec, from a plurality of possible codecs, for communication with the given counterpart; (b) based at least in part on results of the evaluation, determines a respective setting for each of one or more access parameters affecting a likelihood of successfully establishing the communication with the given counterpart; and (c) performs the communication-origination process, according to the determined settings for the one or more access parameters, to initiate the requested communication with the given counterpart.

In another aspect, an exemplary system of a UE includes a user interface component operable to generate input data indicating a communication-origination request for the UE to initiate a communication with a given counterpart, at least one processor, and program instructions stored on a non-transitory computer readable medium. The program instructions are executable by the at least one processor to: (a) use historical communication data for one or more previous communications as a basis to evaluate whether the UE is likely to be assigned a particular codec, from a plurality of possible codecs, for the requested communication with the given counterpart; (b) based at least in part on results of the evaluation, determine a respective setting for each of one or more access parameters affecting a likelihood of successfully establishing the requested communication with the given counterpart; and (c) initiate the communication-origination process according to the determined settings for the one or more access parameters in an effort to establish the requested communication with the given counterpart.

In yet another aspect, an exemplary method involves a UE receiving a page message for a communication initiated by a given counterpart. The method further involves, in response to the page message, the UE: (a) using historical communication data for one or more previous communications as a basis for evaluating whether the UE is likely to be assigned a particular codec, from a plurality of possible codecs, for the communication initiated by the given counterpart; (b) based at least in part on results of the evaluation, determining a respective setting for each of one or more access parameters affecting a likelihood of a serving base station successfully receiving a page response message; and (c) sending, by the UE, the page response message according to the determined settings for the one or more access parameters.

These as well as other aspects, advantages, and alternatives, will become apparent to those of ordinary skill in the art by reading the following detailed description, with reference where appropriate to the accompanying drawing

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. Exemplary Network Infrastructure

Figure 1:
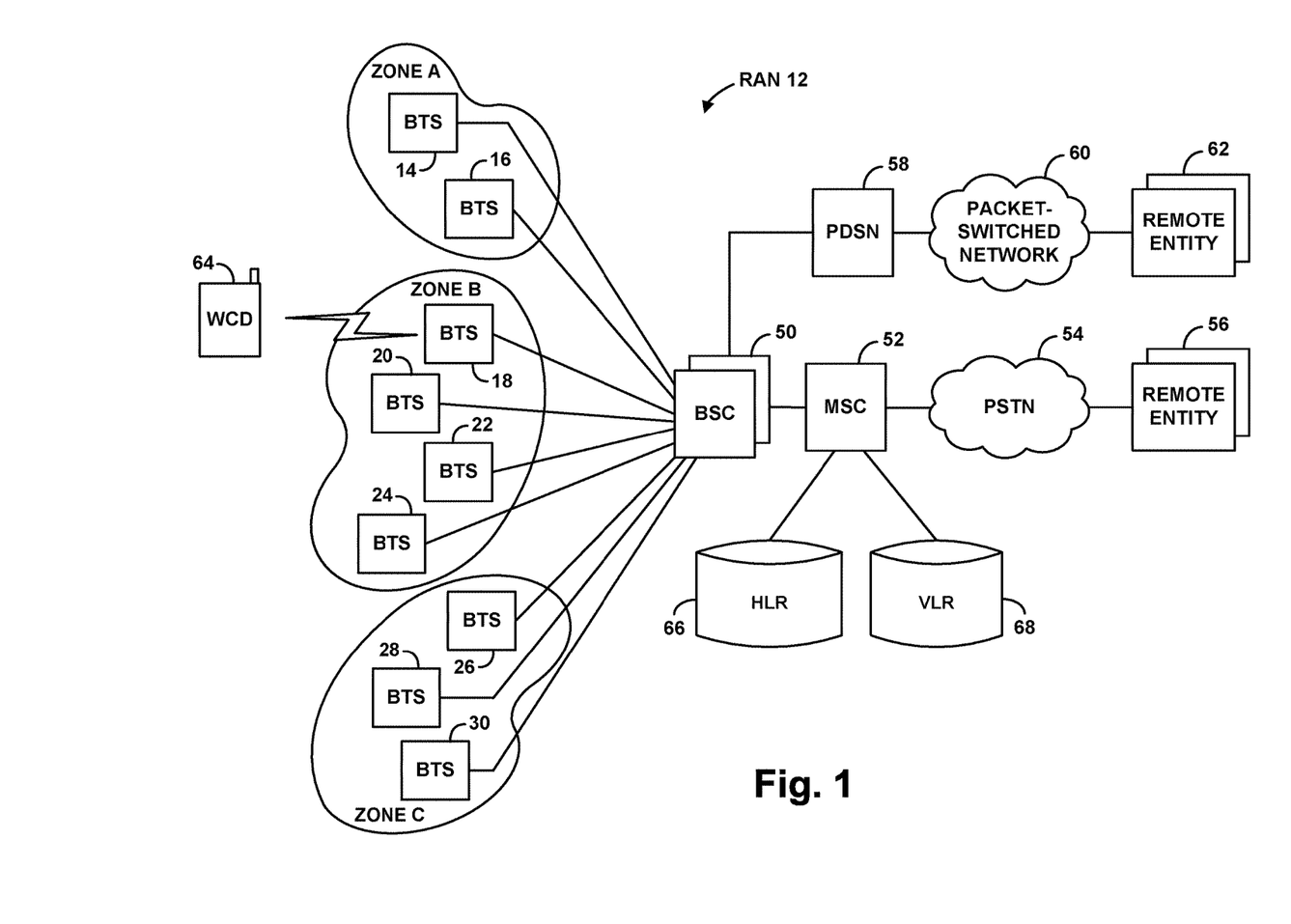
FIG. 1 is a simplified block diagram of a wireless communication network in which an exemplary embodiments can be implemented.

Referring now to the drawings, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

As shown in FIG. 1, the exemplary network includes at its core a radio access network (RAN) 12 that radiates to define numerous coverage areas in which various types of user equipment (UE) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served UE can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas to communicate with UEs in those coverage areas. The coverage areas can be cell sites, cell sectors, or some other defined wireless coverage area (possibly even a combination of coverage provided by multiple base stations).

Each base station controller may be coupled with one or more switches, such as a mobile switching center (MSC) 52, which provides connectivity with the public switched telephone network (PSTN) 54, so that served UEs can communicate with remote entities 56 on the PTSN. Additionally or alternatively, each base station controller may be coupled with one or more gateways, such as packet data serving node (PDSN) 58, which provides connectivity with a packet-switched network 60, so that served UEs can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative UE 64 by way of example, which could be a cell phone, wirelessly equipped personal digital assistant (PDA), or any other type of wirelessly-equipped device now known or later developed. The UE is preferably equipped with hardware, software, and/or other logic to communicate with RAN 12 in accordance with an agreed communication protocol, such as one of the protocols noted herein for instance. For example, in an exemplary embodiment, UE 64 includes a wireless communication interface that functions to facilitate air interface communication with RAN 12 according to one or more protocols such as those noted above. Further, UE may include a user interface, which typically includes components for receiving input from a user of UE and providing output to a user of the UE. Yet further, UE 64 may include program logic stored in data storage (e.g., one or more volatile and/or non-volatile storage components of the UE, such as magnetic, optical, or organic storage components) and executable by one or more processors (e.g., general purpose and/or special purpose processors) to carry out various functions described herein.

Each UE, such as UE 64, typically has at least one associated identifier that uniquely identifies the UE. By way of example, a UE may have a unique mobile directory number (MDN), a unique International Mobile Subscriber Identity (IMSI), a unique MAC address, or some other identifier dynamically or statically assigned to the UE, which may serve as its address for receiving air interface communications transmitted to it by the RAN. As a specific example, an IMSI is a unique number associated with the UE, typically taking the form of the UE's phone number. Additionally or alternatively, each UE may be assigned a mobile identification number (MIN).

To keep track of where UEs, such as UE 64 are operating, a RAN 12 may include a visitor location register (VLR) 68 and a home location register (HLR) 66, as shown in FIG. 1. VLR 68 may include information related to UEs that are currently being served by MSC 52, while HLR 66 may include information related to all UEs that utilize RAN 12.

In a further aspect, each UE may have a service profile stored in the HLR 66 and/or in the VLR 68 that corresponds to the MSC 52 that is currently serving a UE 64. Each MSC 52 may be coupled to the HLR 66 and or its VLR 68 by an out of band signaling network such as a Signaling System #7 (SS7) network, for instance, and may thus access the service profile for a UE using an identifier for the UE, such as its MIN, MDN, and/or IMSI.

VLR 68 and/or HLR 66 may obtain information regarding the locations of UEs through registration messages that the UEs transmit at various times. For example, a UE might transmit a registration message that identifies its current cell-sector when the UE first powers-up, at regular time intervals thereafter (e.g., every 10 minutes), and in response to other triggers (such as moving a certain distance or moving into a different paging zone). These registration messages could be received by VLR 68 and HLR 66. In this way, VLR 68 and HLR 66 may maintain location for each UE in its service area (which could be, for VLR 68, the area served by MSC 52 and, for HLR 66, all areas served by RAN 12). The location information for a UE could include an identification of the cell-sector that the UE reported in its most recent registration message and the date/time of the most recent registration message. HLR 66 and/or VLR 68 could also maintain other types of location information for UEs.

II. Accessing a Network

When a UE 64 seeks to, as examples, originate a CDMA communication session (e.g. a voice call) or respond to a CDMA page message from a base station, the UE may send one or more messages known as access probes to the base station over a reverse-link CDMA access channel. As part of this process, the UE may determine a transmit power level at which to send communications to the base station.

To arrive at an appropriate transmit power for communications, a UE 64 typically determines an initial power level at which to send an initial access probe, and then transmits the access probe. If the base station (e.g., a BTS 14-30) does not acknowledge the initial access probe, the UE 64 then re-transmits the access probe at an incrementally higher power level (e.g., 3 dB higher than the previous access probe). The UE 64 repeats this process (i.e., incrementally increasing the power level and re-transmitting) until either receiving an acknowledgement from the base station or reaching a set number (e.g., five) of transmitted access probes. The UE 64 may then wait a timeout period, and start again at the initial power level. The UE may repeat this entire cycle a set number of times (e.g., three) before concluding that the base station is not reachable, or perhaps waiting a longer timeout period before starting the entire sequence over. (It should be noted that variations on this access-probe-sending sequence exist as well, as this description is merely an example.)

Herein, the initial power level used for the initial attempt to send an access probe may be referred to herein as the "initial transmit power." The amount by which a UE 64 increases its transmit power upon each successive attempt in an access-probe cycle may be referred to herein as the "probe-power-increase amount." Furthermore, the power level that is ultimately determined to be appropriate for reverse-link communications (e.g., the transmit power used to send the access probe when an acknowledgement approving the transmit power is received from the base station), is referred to herein as the "verified transmit power."

Further, as used herein, the "maximum probe number" may refer to the maximum number of access probes that a UE 64 can send in each access-probe cycle. Yet further, the "maximum cycle number," as used herein, may refer to the maximum number of times a given UE 64 may repeat the access-probe cycle described above. In addition, the term "access-probe timer" may be used herein to refer to a timer that specifies the period of time that a UE 64 waits between attempts to send an access-probe during a given access-probe cycle.

In some embodiments, a UE may implement the IS-2000 open-loop power-control process, which involves the UE determining an initial transmit power in decibels (dB), and then sending an access probe at the determined initial transmit power. Then, if no acknowledgement is received, UE 64 may increase its transmit power and retransmit the access probe until either an acknowledgment is received, or the attempt to connect is deemed to have failed (e.g., after a certain number of attempts without acknowledgement or after a predetermined timeout period has elapsed without acknowledgement). When an acknowledgement is received, the UE may sets its transmit power for reverse-link transmissions equal to the transmit power used for the most-recent access-probe attempt. The UE may then update its reverse-link transmit power as needed, using feedback from the RAN that is provided according to closed-loop power control.

In practice, a UE operating under IS-2000 may determine the initial transmit power (ITP) at which the UE transmits the initial access probe during the open-loop power control as follows:

$$ITP = -(RSSI) - 76 + (Nom\_Pwr) + Probe\_Adj\_Pwr + E_c/I_o\_Correction$$

In the above calculation, the Received Signal Strength Indicator (RSSI) is typically an indication of received signal strength at the UE, as measured by the UE. A UE may determine RSSI using techniques that are well known to those skilled in the art. The Nominal Power (Nom_Pwr) is typically a network setting that is determined by the BSC or another network entity and relayed to a UE in a page message that is transmitted when the UE powers on. In practice, Nom_Pwr typically is set to a constant value ranging from zero and three. The Probe Adjust Power (Probe_Pwr_Adj) parameter is typically a constant that is predefined by the service provider, and is also provided to a UE by the access network. Further, the $E_c/I_o$_Correction parameter helps correct for interference, and may be based on the interference experienced on the forward link ($E_c/I_o$).

To facilitate access by UEs, a RAN 12 may broadcast an access parameters message in each coverage area it serves. The access parameters message and/or other such overhead messages for a given coverage may indicate settings for certain access parameters to be used by UEs in the coverage area, such as some or all of the access parameters described herein. For example, in some embodiments, an access parameters message could explicitly indicate an ITP to be used by UEs, a maximum number of attempts to send an access probe per cycle, a maximum number of cycles before deeming an access process unsuccessful, and/or other access parameters. Further, the access parameters message and/or other such overhead messages may provide information that can be used by UEs in the coverage area to determine individual settings for certain access parameters. For example, the access parameters message could include values for Nom_Pwr or Probe_Pwr_Adj, which a UE could use to determine its ITP. Other examples are also possible.

Note that when a UE implements an exemplary method, such as those described herein, the UE may increase its transmission power and/or other access parameters beyond the settings that are specified for it by the RAN. For example, when a UE determines that an incoming or outgoing call is likely to be an HD Voice call, the may increase its initial transmit power and/or other access parameters for a call origination message or a page response message in an effort to increase the probability that the call is successfully connected. Other examples are also possible.

III. Exemplary Codecs

A RAN 12 and/or a UE 64 may use various types of codecs to encode and/or decode a voice call and/or other types of communications. A codec may encode an analog or digital stream of information (e.g., voice, video, still images, music, data, and so on) for transmission and/or storage. For example, a source UE may include a voice codec that receives a spoken utterance from a user, and encodes this utterance according to a particular format. The source UE may then transmit the encoded utterance to a destination UE. The destination UE may include the same (or a similar) voice codec to decode the utterance from the particular format so that the destination UE can play out the resulting signal.

In general, there may be a roughly linear relationship between codec bit rate and the media quality (e.g., the voice quality) that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In an exemplary embodiment, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec, which may also be referred to as CMDA service option (SO) 73, supports some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB.

To support both EVRC-B and EVRC-WB, EVRC-NW includes eight capacity operating points (COPs), which may be referred to as EVRC-NW COP 0 to COP 7, or simply as COP 0 to COP 7. Under EVRC-NW, COP 0 is a rate 1 wideband voice encoder. Further, EVRC-NW COP 4 is a narrowband voice encoder as defined under EVRC-B. EVRC-NW COPs 1 to 3 are narrowband voice encoders that provide higher voice quality as compared to EVRC-B, with COP 1 providing the greatest improvement over EVRC-B. Further, EVRC-NW COPs 5 to 7 are narrowband voice encoders that provide lower voice quality as compared to EVRC-B, with COP 5 being the closest to EVRC-B in quality.

In an exemplary embodiment, a RAN 12 may be configured to determine which codec or codecs are supported by a given UE, and to assign one of the supported codecs to the UE to use for a given communication. The RAN 12 may determine the codec or codecs that are supported by a particular UE in various ways. For example, when a UE 64 originates a call, the UE 64 may transmit an origination message to the RAN 12. This origination message may include an indication of the service options supported by the UE 64. For instance, the origination message may include the UE's preferred service option (e.g., service option 73) as well as one or more auxiliary service options (e.g., service option 3 and/or service option 68) that the UE also supports.

Further, for a UE receiving a call (e.g., a callee UE), the RAN may store or have access to a profile that includes indications of the service options supported by the UE. This profile may also specify the UE's preferred service option as well as one or more auxiliary service options that the UE also supports. Thus, for an incoming call to a callee UE, the RAN may receive an indication that a call has arrived at the RAN for the callee UE, access the profile of the callee UE to determine the supported codecs, and based on various factors discussed in more detail below, determine which codec to assign to the callee UE for the call.

In some embodiments, the HLR and/or the VLR may indicate the service option capabilities for individual UEs that have registered with the RAN. For example, the HLR and/or VLR may indicate that a particular UE is configured for SO 73. In an exemplary embodiment, this may be interpreted as implying that the particular UE is capable of using any of COP 1 to COP 7, and that a base station (e.g., a BTS), may negotiate whether the particular UE is capable of COP 0 (i.e., HD Voice).

As noted above, in order to conduct an HD Voice call (e.g., utilizing COP 0), it may be necessary for all participants in the call to be capable of HD Voice. Thus, when a BTS 18 receives a call origination message from an originating UE 64 directed to a terminating UE 67, the BTS 18 may coordinate with its serving MSC 52 to access the VLR 68 and determine which service options are supported by the originating UE 64. Similarly, when UE 7 acknowledges a page by sending the RAN 12 a page response message via its serving BTS 28, the RAN 12 may determine which service options are supported by the terminating UE 67 (e.g., by again accessing VLR 68 and/or by way of the UE 67 including such information in the page response message). The RAN 12 (e.g., MSC 52, BSC 50, and/or BTS 18 and 28) may then determine which codec to assign for the call based on the capabilities of the originating UE 64 and the terminating UE 67, and perhaps other factors such as traffic levels in the coverage area where UE 64 and UE 67 are being served, among other possibilities.

For purposes of marketing and customer satisfaction, it may be desirable for a wireless carrier to promote HD Voice calls. However, if a call origination message or page response message fails, then the call may be dropped, even when HD Voice would have otherwise been possible. Accordingly, exemplary methods may be implemented by a call originating UE 64 to adjust access parameters to increase the probability a call origination message is received when there is an indication that the terminating UE 67 is likely to meet criteria for use of, or at least is capable of, HD Voice. Additionally or alternatively, exemplary methods could be implemented by a call terminating UE 67 to adjust access parameters to increase the probability a page response message is successful when there is an indication that the originating UE 64 is likely to meet criteria for use of, or at least is capable of, HD Voice.

It should be understood that the codecs and codec assignment processes described herein are only examples. It is contemplated that other voice or non-voice codecs, and other assignment processes, can be utilized.

IV. Exemplary Components of a Wireless Communication Device

Figure 2:
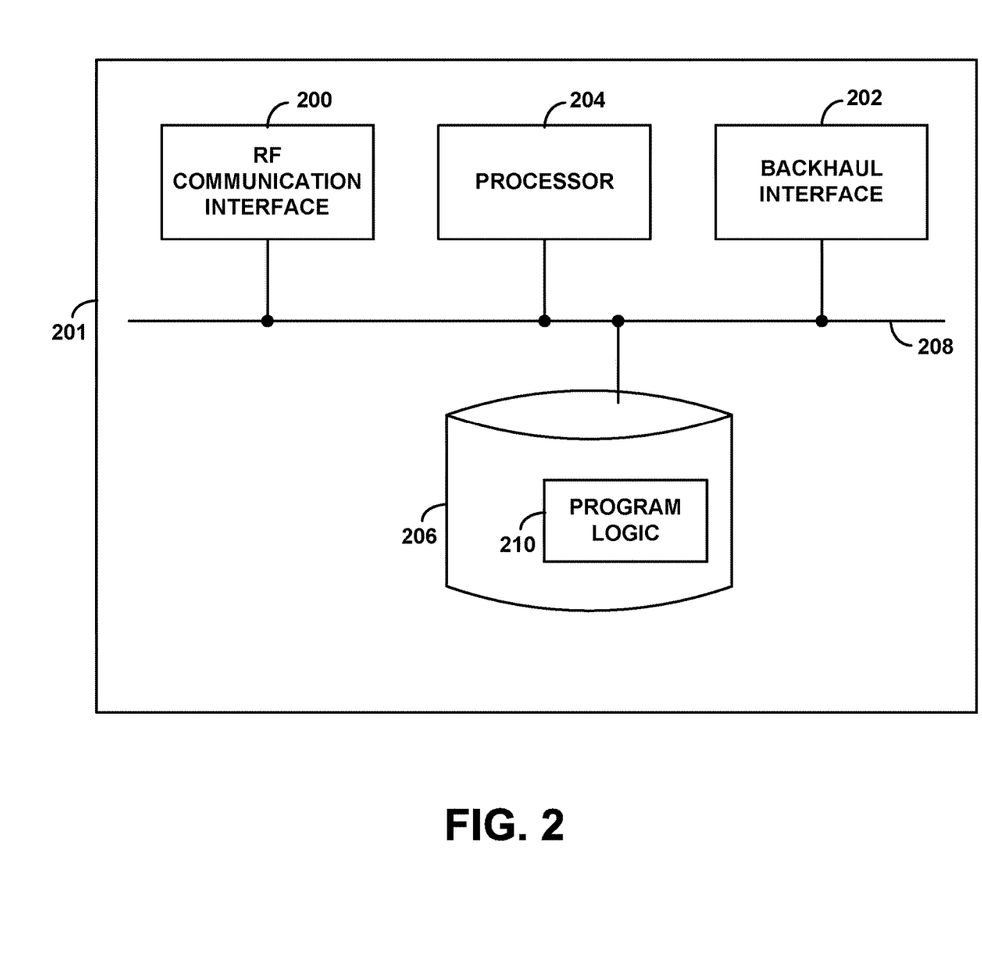
FIG. 2 is a simplified block diagram showing functional components of a UE 201, according to exemplary embodiments.

FIG. 2 is a simplified block diagram showing functional components of a UE 201, according to an exemplary embodiment. As shown, the UE 201 may include an RF communication interface 200, a processor 204, and data storage 206, all of which may be communicatively linked together by a system bus 208, or by one or more other connection mechanisms. In practice, UE 201 may take the form of a cell phone, personal digital assistant, wirelessly equipped computer, or any other computing device that is operable to support communications via a connection to a RAN.

RF communication interface 200 may include and/or interface with one or more antenna structures, one or more power amplifiers, and associated equipment, for engaging in RF communication with BTSs of a RAN, according to one or more of the air interface protocols noted herein, and possibly other air interface protocols as well.

Further, data storage 206 may take the form of or include one or more volatile and/or non-volatile storage components, such as magnetic, optical, or organic storage components, integrated in whole or in part with processor 204. As further shown, data storage 206 may include program logic 210 (e.g., program instructions) that are executable by processor 204 to carry out various functions, such as the functionality of UEs described herein. Processor 204 may take the form of one or more processors (e.g., general purpose and/or special purpose processors), such as microprocessors for instance.

To facilitate exemplary functionality described herein, a UE 201 may store (e.g., in data storage 206) or have access to (e.g., via RF communication interface 200) historical communication data that indicates counterpart information (e.g., device identification (ID) data and/or contact information) and codec information for each of the one or more previous communications that involved the UE and at least one counterpart entity (e.g., a device or contact). In exemplary embodiments, such historical communication data could be maintained for UE-terminating calls, UE-originating calls, or both.

In some embodiments, data storage 206 may include program instructions executable to create and/or maintain such historical communication data. For example, whenever a base station instructs a UE 201 to use a certain operating point for a voice call, the UE may store a record of the operating point that is assigned to the UE (e.g., one of EVRC-NW COPs 0 to 7), as well as an identifier(s) for the counterpart(s) in the voice call (e.g., a device ID, telephone number, and/or account ID associated with each counterpart device). In some embodiments, the UE 201 might store a binary indication as to whether or not the UE was assigned a codec for HD Voice (e.g., COP 0) for the call, instead of or in addition to the specific codec that was assigned for the call. Further, in some embodiments, the UE 201 could store an indication of the coverage area (e.g., the cell ID or sector ID) in which the operating point was assigned to the UE for the voice call, and perhaps even the coverage area(s) of the counterpart(s), if this information is available to the UE.

Provided with such historical communication data, in exemplary embodiments, program logic 210 may be executable by processor 204 to: (a) use historical communication data for one or more previous communications as a basis to evaluate whether the UE is likely to be assigned a particular codec, from a plurality of possible codecs, for the requested communication with the given counterpart, (b) based at least in part on results of the evaluation, determine a respective setting for each of one or more access parameters affecting a likelihood of successfully establishing the requested communication with the given counterpart, and (c) initiate the communication-origination process according to the determined settings for the one or more access parameters in an effort to establish the requested communication with the given counterpart.

V. Exemplary Methods

Exemplary methods may be carried out by a UE (e.g., by a component or components of a UE), in an effort to improve the likelihood of successfully establishing a voice call, when the voice call is directed to a counterpart with which assignment of a codec for HD voice (or another specific codec of interest) is possible or likely. It should be understood, however, that exemplary methods or portions thereof may be implemented by other types of entities or combinations of entities, and/or may be implemented for purposes other than those described herein, without departing from the scope of the invention.

Figure 3:
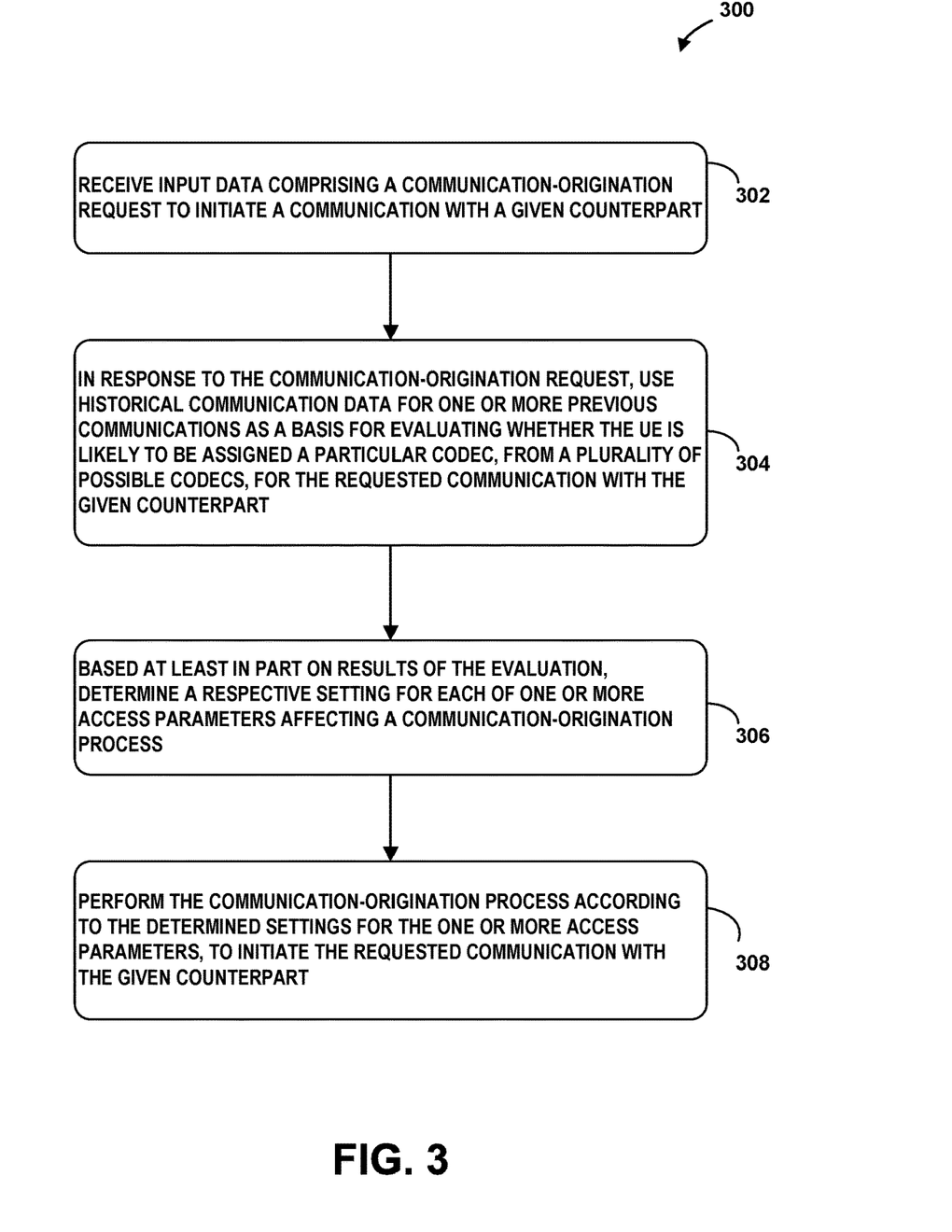
FIG. 3 is a flow chart illustrating a method, according to exemplary embodiments.

FIG. 3 is flow chart illustrating a method 300, according to an exemplary embodiment. As shown by block 302, method 300 involves a UE receiving input data comprising a communication-origination request to initiate a communication with a given counterpart. In response to the communication-origination request, the UE uses historical communication data for one or more previous communications as a basis for evaluating whether the UE is likely to be assigned a particular codec, from a plurality of possible codecs, for the requested communication with the given counterpart, as shown by block 304. Then, based at least in part on results of the evaluation, the UE determines a respective setting for each of one or more access parameters affecting a communication-origination process, as shown by block 306. The UE then performs the communication-origination process, according to the determined settings for the one or more access parameters, to initiate the requested communication with the given counterpart, as shown by block 308.

Further, the communication-origination request received at block 302 may cause the UE to send a call origination request to the RAN to initiate the requested voice call. However, it should be understood that some or all of method 300 may be sent before the UE sends a call origination request to the RAN. As such, an exemplary method, may allow for UE to predict or estimate the chances that the UE will be assigned a particular codec (such as the codec for HD Voice), and to adjust its access parameters accordingly, before the codec for the call is assigned to the UE by the RAN.

A. Receiving a Communication-Origination Request

As noted above, block 302 involves a UE receiving a communication-origination request to initiate a communication with a given counterpart. This request may take the form of input data received via a user interface of the UE. For example, the request may be input data received when a user dials a number, presses a "call" or "dial" button, or interacts with a touchscreen interface to initiate a voice call to particular contact, or possibly to multiple contacts. More generally, the communication-origination request may be any type of data or event that indicates to initiate a voice communication with at least one particular counterpart contact or device.

B. Evaluating Likelihood of being Assigned a Particular Codec

As noted above, block 304 involves the UE using historical communication data for one or more previous communications as a basis for evaluating whether the UE is likely to be assigned a particular codec for the requested communication with the given counterpart. To do so, the UE may utilize various types of historical communication data. For example, the UE may evaluate counterpart information (e.g., device identification (ID) data and/or contact information) and codec information for each of the one or more previous communications that involved the UE and at least one counterpart entity (e.g., a device or contact).

As noted above, to facilitate exemplary functionality, the UE may track historical communication data (e.g., a call-history database) that includes counterpart information and codec information for each of the one or more previous communications (e.g., voice calls) involving the UE. Note that the database maintained by a given UE could include information for calls that originate from and/or calls that terminate with (e.g., that are directed to) the given UE. Each record in the database may indicate the counterpart or counterparts for a particular call, and the codec that was assigned for use during the call. (In the event that multiple codecs were used at different points during a given call, the database entry for the call may identify all of the codecs that were utilized for the call.) In some cases, the database entry each call could further include other information related to the call, such as the location or locations of the UE and/or the location of the counterpart during the call (e.g., GPS coordinates), and/or the coverage area or areas where the UE and/or the counterpart were located during the call (e.g., cell ID(s) or sector ID(s)), among other possibilities.

Provided with such information, block 304 could involve the UE using the historical communication data as a basis for determining historical codec data for one or more previous communications with the given counterpart. Then, based at least in part on the historical codec for the one or more previous communications with the given counterpart, the UE can evaluate whether the UE is likely to be assigned the particular codec for the requested communication with the given counterpart.

For example, at block 304, when the UE initiates a call to a particular counterpart (e.g., using the counterpart's phone number), the UE could identify a call record for the most recent call (e.g., the last call) to or from that counterpart. The UE can then determine the codec (or codecs) that were utilized by the UE for the most recent call to the counterpart. If the UE was assigned a certain higher-quality codec (e.g., for HD Voice) for the last call with the counterpart, then the UE may consider this an indication that the UE is likely to be assigned a higher-quality codec for the call that the UE is currently initiating. And, if the UE was not assigned a certain higher-quality codec (e.g., for HD Voice) for the last call with the counterpart, then the UE may consider this an indication that the UE is unlikely to be assigned a higher-quality codec for the call that the UE is currently initiating.

In some embodiments, if records for multiple previous calls to the particular counterpart are available, then the UE could utilize some or all of the entries for previous calls when evaluating whether the likelihood of being assigned particular high-quality codec for a call that the UE is currently initiating. For instance, in some implementations, the UE could access records for up to the last 10 calls between the UE and a particular counterpart, and determine the number or percentage of those previous calls where a codec for HD Voice was utilized. This number or percentage of previous calls where HD Voice was utilized may then be interpreted as an indication of the likelihood that the UE will be assigned a codec for HD Voice for the call that is currently being initiated with the particular counterpart.

In some embodiments, block 304 could alternatively involve a simple evaluation as to whether or not the counterpart is capable of HD Voice. In such embodiments, assignment of a codec for HD Voice may be considered "likely" for purposes of setting access parameters, so long as the UE has a record of at least one previous HD Voice call with the particular counterpart.

Additionally or alternatively, block 304 could involve the UE identifying cohort entries from the call-history database, and using the cohort entries to evaluate the likelihood of being assigned a particular codec for the currently requested communication with a given counterpart. Herein, a "cohort" for a given counterpart, should be understood as a device or entity that is different from the particular counterpart, but that has a certain characteristic or characteristics in common with the particular counterpart, such that codec assignments for past calls between the UE and cohort provide information that is helpful in determining the likelihood a call that is being initiated to the counterpart will be assigned a particular codec.

Accordingly, at block 304, a UE may compare of one or more characteristics the given counterpart to which a call is being initiated to one or more other counterparts having records in the UE's historical communication database. Based on such comparison of one or more characteristics, the UE may identify one or more cohorts to the given counterpart, and determine historical codec information for one or more previous communications with the one or more cohort counterparts. And, based at least in part on this historical codec information for the one or more cohorts, the UE may evaluate whether the UE is likely to be assigned the particular codec for the requested communication with the given counterpart.

In such embodiments, various characteristics may be used to identify a cohort for a given counterpart to a call. For example, a UE may compare device type or device class of the a potential cohort and a given counterpart, since a device type or class may be indicative of a devices capabilities (such as being configured for HD Voice calls). Additionally or alternatively, the UE could compare a subscription plan information of a potential cohort and a given counterpart, since different subscription plans may provide for different levels of quality-of-service (QoS) and/or different features, such as the ability to engage in HD Voice calls. Other characteristics could also be utilized to identify cohorts of the particular counterpart.

C. Determining Settings for Access Parameters

As noted above, block 306 involves a UE determining a respective setting for each of one or more access parameters based on the evaluation as to whether the UE is likely to be assigned a particular codec. In exemplary embodiments, this determination may involve the UE determining a setting for one or more access parameters that affect a likelihood of successfully establishing a communication with the particular counterpart. For example, at block 306, the UE may determine settings for one or more access parameters including, but not limited to: (a) the maximum number of access probes per access-probe cycle, (b) the maximum number of access-probe cycles, (c) one or more transmit-power parameters for access probes, such as the initial transmit power and/or a probe-power-increase parameter, and/or (d) a duration parameter for a period between consecutive access-probes. Other access parameters may additionally or alternatively be determined based on a likelihood of a call with a particular counterpart being assigned a particular codec, without departing from the scope of the invention.

More specifically, block 306 could involve a UE determining or adjusting a setting for the initial transmit power used to send a call origination message. In an exemplary embodiment, the UE may increase its initial transmit power to a higher power level when the UE determines it is likely that a call to particular counterpart will be an HD Voice call. In particular, the UE may increase its initial transmit power for calls that the UE has determined are likely to be assigned a codec for HD Voice (e.g., based on a previous call with the counterpart, or a certain number or percentage of previous calls with the counterpart, being assigned COP 0), as compared to the initial transmit power setting for calls that are not likely to be assigned a codec for HD Voice.

For example, a UE may initially receive a value for its initial transmit power (ITP) from the RAN. The UE can then multiply the initial transmit power value that is indicated by the RAN by a factor that increases the initial transmit power, when the UE determines it is likely to be assigned codec for HD Voice. For example, the UE could multiply the initial transmit power by a factor of 1.3 when the last call to the particular counterpart utilized COP 0, or when a certain number of percentage of the previous calls to the particular counterpart utilized COP 0. Other examples are of course possible. By increasing its initial transmit power for a call origination request when the UE determines it is likely HD Voice will be assigned to a call with a particular counterpart, the UE may increase the likelihood that the RAN successfully receives the call origination message, and the thus the likelihood that an HD Voice call is successfully established (as compared to a non-HD Voice call).

Additionally or alternatively, in some embodiments, block 306 could involve a UE determining or adjusting a probe-power-increase parameter for a call origination request. In such embodiments, the probe-power-increase parameter can indicate an amount by which the UE should increase the transmit power upon each successive attempt to transmit a call origination request for a given call to a given counterpart. As such, the UE could increase the value of the probe-power-increase parameter, when the UE determines it is likely to be assigned codec for HD Voice.

For example, the UE could set the probe-power-increase parameter to 7 dB when its last-assigned codec for a call with a given counterpart was COP 0, such that the transmit power increases by 7 dB on each subsequent attempt to send an access probe to a counterpart with which the UE previously engaged in an HD Voice call. On the other hand the UE might set the probe-power-increase parameter to 5 dB (or another lesser increase) for a call origination request to a UE for which the likelihood of being able to use HD Voice is low. By increasing its transmit power adjustments for subsequent attempts when the UE determines it is likely HD Voice communication will be possible with a particular counterpart, the UE may increase the probability that the RAN successfully receives the call origination request, and the thus the likelihood that an HD Voice call is successfully established (as compared to a non-HD Voice call).

Additionally or alternatively, in some embodiments, block 306 could involve a UE setting a maximum-probe parameter for a call origination request. Generally, the maximum-probe parameter may indicate the maximum number of access probes that can be sent by the UE per access-probe cycle. As such, the UE could increase the value of the maximum-probe parameter, when the UE determines it is likely to be assigned codec for HD Voice for a call with a particular counterpart. By doing so, the UE may increase the maximum number of access probes it can send per cycle when it more likely the UE will be assigned a for HD Voice, and thus increase the probability that the RAN successfully receives a call origination request and establishes a call that is likely to use HD Voice.

As an example, the UE could set the maximum-probe parameter equal to 10 when the UE was assigned COP 0 for the last call with the counterpart for the currently requested call (or a certain number or percentage of previous calls with the counterpart), such that a maximum of 10 probes can be sent per cycle. On the other hand, the UE could set the maximum-probe parameter equal to 6 (or another value lower than that assigned when it is likely COP 0 will be assigned) when sending a call origination request to counterpart for which the likelihood of being able to use HD Voice is comparatively lower.

Additionally or alternatively, in some embodiments, block 306 could involve a UE setting maximum-cycle parameter for a call origination request. Generally, the value of the maximum-cycle parameter may indicate the maximum number of unsuccessful access-probe cycles, before it is determined that a call origination request has failed. As such, a UE could increase the value of the maximum-cycle parameter when sending a call origination request for a call to a counterpart with which it is likely that HD Voice will be assigned. By doing so, the UE may increase the maximum number of access-probe cycles that are possible for a call origination request that is likely to result in establishment of an HD Voice call, as compared to a call origination request when the UE believes it is unlikely the resulting call will be conducted using HD Voice. As such, the UE may increase the probability that HD Voice calls are successfully established, as compared to non-HD Voice calls.

For example, the UE could set the maximum-cycle parameter equal to five when it was COP 0 for its last call with the counterpart with which the UE is currently seeking to establish a call, such that a maximum of five access probe cycles are possible. On the other hand the UE might set the maximum-cycle parameter equal to three, four, or another comparatively lower value, when it is deemed unlikely that HD Voice will be utilized for a call being initiated by the UE. Other examples are of course possible.

Additionally or alternatively, block 306 could involve a UE setting the duration of an access-probe timer for a call origination request to initiate a call with a particular counterpart. Generally, the duration of the access-probe timer can indicate the amount of time the UE waits between consecutive attempts to send an access probe (such as a call origination request). In an exemplary embodiment, the UE could increase the duration of the access-probe timer when the UE determines it is likely to be assigned codec for HD Voice for a call with a particular counterpart. By allowing more time between consecutive attempts, the UE may increase the likelihood that the network conditions that led to a failed attempt have changed by the time the next attempt is made. Other techniques for setting and/or adjusting the duration of the access-probe timer are also possible.

In a further aspect, a UE may use various techniques to determine when a call is likely to be an HD Voice Call (or more generally, whether a particular codec is likely to be assigned for the call), which in turn causes the UE to adjust access parameters as described above.

For example, a UE may determine it is likely that a call being initiated will be assigned a codec for HD Voice when the last call to the same counterpart (e.g., to the same phone number and/or same counterpart device) was an HD Voice call. In such embodiments, the UE may adjust one or more access parameters to increase the likelihood of successfully establishing the call when the last call to the particular counterpart was assigned the codec for HD Voice (or whatever the particular codec of interest is in the given implementation), as described above.

As another example, a UE may determine it is likely that a call being initiated will be assigned a codec for HD Voice when the number or percentage of the previous call with particular counterpart that were HD Voice calls is greater than a threshold number or percentage. The particular value for the threshold may be set as a matter of engineering design choice. Further, the UE could consider only a certain number or previous calls with the given counterpart (e.g., up to ten of the most recent calls with the counterpart), or base the decision on the number or percentage of calls that use HD Voice over all previous calls with the given counterpart. When the number or percentage of previous calls UE can then adjust one or more access parameters to increase the likelihood of successfully establishing the call when the last call to the particular counterpart was assigned the codec for HD Voice (or whatever the particular codec of interest is in the given implementation), as described above.

Further, in such an implementation (and perhaps in other implementations), the UE may weigh the contribution of previous calls to the overall number or percentage that is compared to the threshold, based on how recent each call record is. For example, a UE could apply a decay factor that decreases the relative weight that is given to each call record with a particular counterpart over time.

In another aspect of some implementations, a UE may determine it is likely that a call being initiated will be assigned a codec for HD Voice when the counterpart device is capable of HD Voice. In such embodiments, the UE can adjust one or more access parameters to increase the likelihood of successfully establishing the call with the particular counterpart, when any one of the previous calls with the particular counterpart was an HD Voice call.

Further, it is contemplated that a UE may implement other techniques, and variations on the techniques described herein, in order to determine when assignment of a particular codec is likely.

D. Performing the Communication-Origination Process

As noted above, block 308 involves the UE performing a communication-origination process according to the determined settings for the one or more access parameters. Block 308 may thus involve the UE sending a call origination message or request to its serving base station, or taking any other action to initiate a voice call.

E. Adjusting Access Parameters for a Page Response Message

While the above methods are described in the context of a UE that is originating a voice call to another device (e.g., an originating mobile device), it should be understood that exemplary methods can also be implemented by a UE that is being called by another device (e.g., a terminating mobile device). In particular, a UE could also implement an exemplary method when a page message is received, in order to adjust access parameters that affect the likelihood that the UE's page response message is successfully received by the RAN.

Figure 4:
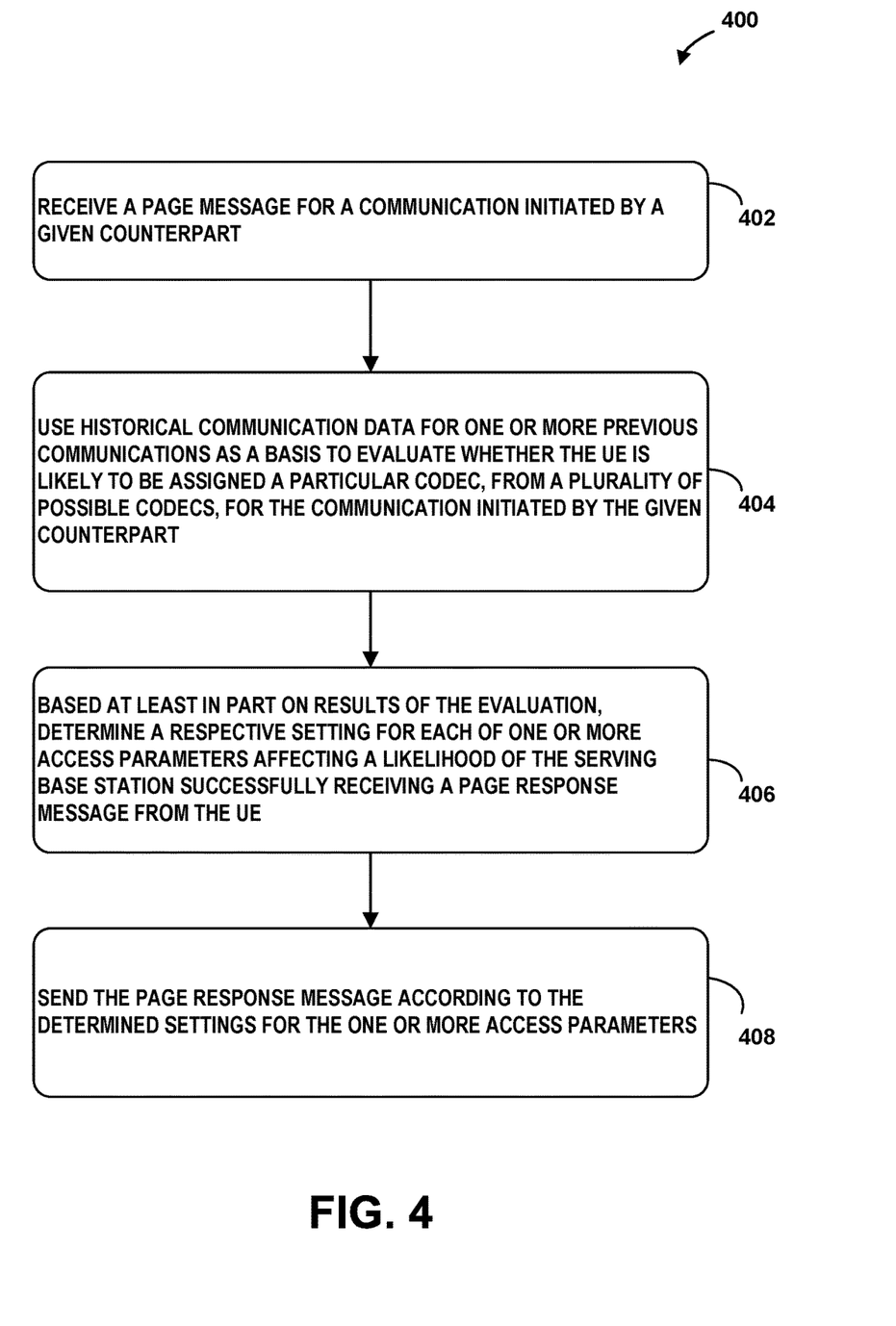
FIG. 4 is a flow chart illustrating another method, according to exemplary embodiments.

For example, FIG. 4 is a flow chart illustrating another method 400, according to exemplary embodiments. In particular, method 400 may be implemented by a UE to increase the likelihood of a page response message being successfully received, when the UE determines that the call for which the page response message is being sent is likely to be assigned a particular codec (e.g., HD Voice).

As shown, block 402 involves a UE receiving a page message for a communication initiated by a given counterpart. In response to the page message, the UE uses historical communication data for one or more previous communications as a basis for evaluating whether the UE is likely to be assigned a particular codec, from a plurality of possible codecs, for the communication initiated by the given counterpart, as shown by block 404. Then, based at least in part on results of the evaluation, the UE determines a respective setting for each of one or more access parameters affecting a likelihood of the UE's serving base station successfully receiving a page response message from the UE, as shown by block 406. The UE then sends the page response message according to the determined settings for the one or more access parameters, as shown by block 408.

F. Consideration of SRLTE Capability of a UE

In some embodiments, a UE may condition the performance of an exemplary method upon the UE determining that it is configured as a single-radio LTE (SRLTE) device. In particular, the UE may first evaluate its own configuration and determine whether it configured for SRLTE. Then, if the UE determines that it is configured to operate as an SRLTE device, the UE may perform method 300 and/or method 400. Otherwise, the UE may refrain from carrying out method 300 and/or method 400.

Since an SRLTE UE may periodically tune its radio system away from LTE in order to check for page messages from the CDMA network, and since the process of checking for CDMA page messages involves an SRLTE device disconnecting from the LTE network, an SRLTE device may have lower LTE throughput (e.g., as compared to a device that uses separate radio systems for LTE and CDMA communications). Accordingly, it is desirable to reduce the amount of time an SRLTE spends disconnected from an LTE network in order to listen for page messages from the CDMA network. Accordingly, when an SRLTE UE implements an exemplary method, such as method 300 and/or method 400, the UE may increase the likelihood of successfully establishing a voice call, and thus can reduce the amount of time the UE spends tuned away from the LTE network.

VI. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

Further, while the present disclosure focuses by way of example on an arrangement including CDMA and LTE access networks. It will be understood, however, that the specifics shown and described are intended only as examples, and that numerous variations are possible. For instance, the principles discussed can be applied in an arrangement involving other types of access networks, other types of media systems, and/or other types of devices. Further, even within the examples disclosed, various elements (e.g. components and/or operations) can be rearranged, distributed, integrated, reordered, omitted, added, and otherwise modified.

We claim:

1. A method comprising:
receiving, by a user equipment (UE), a communication-origination request to initiate a communication with a given counterpart; and
responsive to the communication-origination request, the UE:
using historical communication data for one or more previous communications as a basis for determining a likelihood the UE will be subsequently assigned a particular codec by an access network, from a plurality of possible codecs, for communication with the given counterpart;
based at least in part on the determined likelihood the UE will be assigned the particular codec, determining a respective setting for each of one or more access parameters affecting a likelihood of successfully establishing the communication with the given counterpart; and
performing, by the UE, the communication-origination process, according to the determined settings for the one or more access parameters, to initiate the requested communication with the given counterpart.

2. The method of claim 1, wherein the requested communication is a voice call, and wherein the particular codec is a codec corresponding to high definition (HD) voice service.

3. The method of claim 2, wherein availability of HD voice service for a given voice call requires that both an originating device and a terminating device for the voice call are capable of participating in an HD voice call.

4. The method of claim 1, wherein the historical communication data comprises counterpart information and codec information for each of the one or more previous communications involving the UE.

5. The method of the claim 4, wherein the counterpart information comprises contact information for each of the one or more previous communications involving the UE.

6. The method of the claim 4, wherein the counterpart information comprises device identification data for each of the one or more previous communications involving the UE.

7. The method of claim 1, wherein determining the likelihood the UE will be assigned the particular codec for the requested communication comprises:
using the historical communication data as a basis for determining historical codec data for one or more previous communications with the given counterpart; and
based at least in part on the historical codec data for the one or more previous communications with the given counterpart, determining the likelihood the UE will be assigned the particular codec for the requested communication with the given counterpart.

8. The method of claim 1, wherein determining the likelihood the UE will be assigned the particular codec for the requested communication comprises:

based on a comparison of one or more characteristics of the given counterpart to one or more corresponding characteristics of one or more counterparts identified by the historical communication data, identifying one or more cohort counterparts to the given counterpart;

determining historical codec information for one or more previous communications with the one or more cohort counterparts; and based at least in part on the historical codec information for the one or more cohort counterparts, determining the likelihood the UE will be assigned the particular codec for the requested communication with the given counterpart.

9. The method of claim 1, wherein determining the likelihood the UE will be assigned a particular codec comprises determining whether the UE utilized the particular codec during a most-recent previous communication with the given counterpart.

10. The method of claim 9, wherein determining the respective setting for each of the one or more access parameters comprises:

when the UE utilized the particular codec during the most-recent previous communication with the given counterpart, adjusting the one or more access parameters so as to increase a probability of successfully establishing the requested communication.

11. The method of claim 1, wherein determining the likelihood the UE will be assigned a particular codec comprises determining a number or percentage of previous communications with the given counterpart for which the particular codec was assigned.

12. The method of claim 11, wherein determining the respective setting for each of the one or more access parameters comprises:

when the number or percentage of previous communications with the given counterpart where the particular codec was assigned is greater than a threshold number or percentage, adjusting the one or more access parameters so as to increase a probability of successfully establishing the requested communication.

13. A system comprising:

a user interface component operable to generate input data indicating a communication-origination request for a user equipment (UE) to initiate a communication with a given counterpart;

at least one processor; and program instructions stored on a non-transitory computer readable medium and executable by the at least one processor to:

(a) use historical communication data for one or more previous communications as a basis to determine a likelihood the UE will be subsequently assigned a particular codec by an access network, from a plurality of possible codecs, for the requested communication with the given counterpart;

(b) based at least in part on the determined likelihood the UE will be assigned the particular codec, determine a respective setting for each of one or more access parameters affecting a likelihood of successfully establishing the requested communication with the given counterpart; and (c) initiate the communication-origination process according to the determined settings for the one or more access parameters in an effort to establish the requested communication with the given counterpart.

14. The system of claim 13, wherein the user interface component comprises a touchscreen, a microphone, a button, a camera, or a keyboard.

15. The system of claim 13, wherein the requested communication is a voice call, and wherein the particular codec is a codec corresponding to high definition (HD) voice service.

16. The system of claim 13, wherein the historical communication data comprises counterpart information and codec information for each of the one or more previous communications involving the UE.

17. The system of claim 16, wherein the counterpart information comprises contact information, device information, or both, for each of the one or more previous communications involving the UE.

18. The system of claim 13, wherein the determination of the likelihood the UE will be assigned the particular codec for the requested communication comprises:

use of the historical communication data as a basis to determine historical codec data for one or more previous communications with the given counterpart; and based at least in part on the historical codec data for the one or more previous communications with the given counterpart, determine the likelihood the UE will be assigned the particular codec for the requested communication with the given counterpart.

19. A method comprising:

receiving, by a user equipment (UE), a page message for a communication initiated by a given counterpart; and responsive to the page message, the UE:

using historical communication data for one or more previous communications as a basis for determining a likelihood the UE will be subsequently assigned a particular codec by an access network, from a plurality of possible codecs, for the communication initiated by the given counterpart;

based at least in part on the determined likelihood the UE will be assigned the particular codec, determining a respective setting for each of one or more access parameters affecting a likelihood of a serving base station successfully receiving a page response message; and sending, by the UE, the page response message according to the determined settings for the one or more access parameters.

20. The method of claim 19, wherein the requested communication is a voice call, and wherein the particular codec is a codec corresponding to high definition (HD) voice service.

* * * * *